: 3,356,769
PHOSPHONITRILIC HALIDE DERIVATIVES
AND ADDUCTS THEREOF
Harry Rex Allcock, Darien, Conn., assignor to American
Cyanamid Company, Stamford, Conn., a corporation
of Maine
No Drawing. Filed July 13, 1964, Ser. No. 382,382
12 Claims. (Cl. 260—927)

ABSTRACT OF THE DISCLOSURE

Phosphonitrilic compounds of the formula

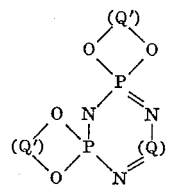

wherein Q' typically is naphthyl-2,3 and Q typically is 2,3-dioxynaphthyl, molecular inclusion adducts of the compounds and organic liquids, and methods of preparing the adducts.

The present invention relates to novel compounds (III) prepared from the reaction of a phosphonitrilic halide trimer or tetramer (I) with a substituted or unsubstituted dihydroxy aromatic compound (II) and a base, pursuant to the following equation:

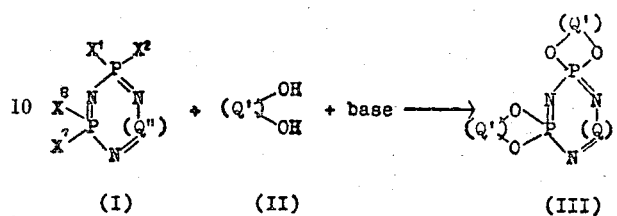

wherein Q" represents

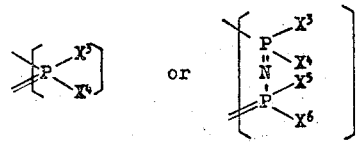

wherein Q represents

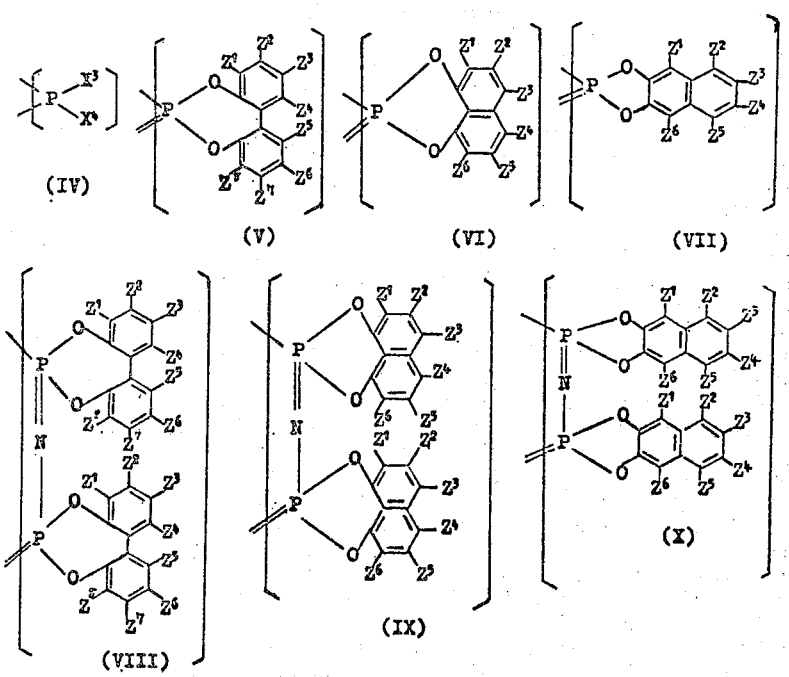

wherein Q' represents

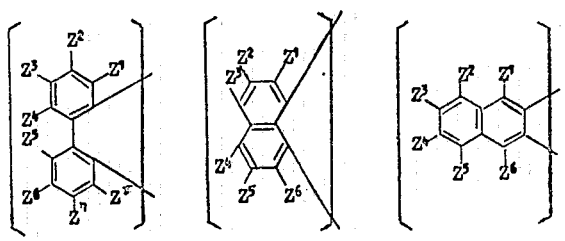

wherein $X^1$ through $X^8$ each represent chlorine or bromine; and wherein $Z^1$ though $Z^8$ each represent hydrogen, lower alkyl, halogen, lower alkoxy, nitro, halogeno(lower)alkyl, cyano, phenoxy and other similar inert (stable) substituents.

This reaction is made to take place in the presence of an organic solvent and the base is one which is capable of forming stable salts with hydrogen chloride or hydrogen bromide.

Typical bases within the purview of the present invention are: alkali metal hydroxides and carbonates, such as potassium, sodium and lithium hydroxides and carbonates; alkaline earth hydroxides and carbonates, such as calcium, magnesium, barium, and ammonium hydroxides and carbonates; quaternary ammonium hydroxides, such as benzyltrimethylammonium hydroxide, tribenzylmethylammonium hydroxide, and tetraalkyl(lower)ammonium hydroxide; guanidines and biguanides, such as hexaalkyl(lower) biguanide, heptaalkyl(lower)biguanide, and tetraalkyl(lower)guanidine; triaalkyl(lower)amines, such as triethylamine, tributylamine, and trimethylamine; ammonia; pyridine; and the like.

Typical inert organic solvents contemplated herein are: ethers, such as dioxane, diethoxyethane, dimethoxyethane, diethylether of diethylene glycol, and tetrahydrofuran; aromatic hydrocarbons, such as benzene, toluene, xylene, mesitylene; acetonitrile; dimethylformamide; dimethylsulfoxide; halogenated aliphatic ($C_1$–$C_8$) hydrocarbons, such as chloroform, trichloroethylene; ketones, such as acetone, diethyl ketone, methylethyl ketone, diisobutyl ketone; and the like. An excess of the base, such as pyridine, trialkylamine, and the like, may be used as a solvent if such base is liquid at reaction temperature. Preferably, however, the solvents listed above are employed.

While the reactions of the present invention are best carried out at a temperature in the range of 25° C. to 100° C., temperatures in the range of −50° C. to 200° C. are contemplated herein. Likewise, atmospheric pressure is preferred, but super-atmospheric pressures and sub-atmospheric pressures may be employed generally with an accompanying change in temperature. For instance, at super-atmospheric pressures higher temperatures may be employed since the boiling temperature of the solvent varies in proportion to the pressure thereon. Generally, when operating at atmospheric pressure, temperatures below the boiling point of the solvent are employed.

Obviously, the molar ratio of reactants (II) and (I), above, determines the product (III) produced by the process of the present invention. For example, the di-substituted trimer represented by product (III), wherein Q is moiety (IV) requires that about two moles (say, 1.7 to 2.3 moles) of reactant (II) per mole of reactant (I) be used. By the same token, the tri-substituted trimer product (III), wherein Q is moiety (V), (VI), or (VII), requires about three moles (say, 2.8 to 3.3 moles) of reactant (II) per mole of reactant (I). To produce the tetra-substituted tetramer in which Q of product (III) represents moiety (VIII), (IX), or (X) about four moles (say, about 3.8 to 4.3 moles) of reactant (II) per mole of reactant $(NPX_2)_4$ is required. Obviously, in producing the di- and tri-substituted trimers, the trimer of reactant (I) is used; on the other hand, in producing the tetra-substituted tetramer product the tetramer reactant (I) is used.

According to the present invention the compounds of formula (III), above, form unusual molecular inclusion adducts with a wide variety of inert organic liquids, such as aliphatic and aromatic hydrocarbons, esters, ethers, ketones, carbon disulfide, and the like. Apparently, the compound of formula (III) physically traps a guest organic compound in its (III) crystal lattice in cavities or channels which result from its unusual molecular configuration.

The molar ratio of guest to host, however, appears to depend on the molecular dimensions of the included, or guest, species. Larger molecules, such as norboradiene, are present in a higher guest to host molar ratio, but smaller molecules, such as acetone, are present in a lower ratio.

Typical methods of preparing the adducts of the present invention will now be shown. According to one method (R) the host compound (III) is dissolved in a very dilute solution of the guest compound in view of the low solubility of the hosts in nearly all solvents, except boiling xylene. Very dilute solutions of benzene, chlorobenzene, styrene, chloroform, cyclohexane, tetrachloroethane, or the like, are used to dissolve the host compound (III) and the latter is then recrystallized therefrom. The recrystallized material is filtered off, air dried, and then dried for at least twenty-four hours in vacuum at 25° C.

Another typical method of preparing the adducts of the present invention is by spontaneous absorption (SA) of the liquid guest by the crystalline host. When the host is treated with an excess of guest organic liquid at room temperature, an exothermic crystal disruption and absorption of the guest organic compound occur. Excess liquid is removed by air drying followed by vacuum drying for twenty-four hours at 25° C. This is a very efficacious way of forming the adducts of the present invention when using mixed or unmixed organic liquids.

It is possible to replace certain guests with others, in view of the selective nature of the host (III) compounds of the present invention. This is accomplished by first absorbing an organic compound, in the manner just described in the host compound, drying same, and subsequently adding a second organic liquid compound to the adduct. Included benzene, for example, can be totally displaced by xylene, carbon disulfide, or the like, using the process just described. Still another (V) method of preparing the adducts herein contemplated involves vapor absorption. For example, a sublimed sample of host compound (III) is placed in an open glass vial and suspended within a closed vessel above the surface of the guest liquid, such as chloroform, benzene or the like. At atmospheric pressure and 25° C. temperature spontaneous absorption of the guest liquid to form adducts takes place. After, say, twelve hours the vial is removed and the solid adduct therein vacuum dried.

The dried adducts of the present invention are stable at room temperature, and no significant loss of included compound occurs upon prolonged exposure to the atmosphere at room temperature, or upon applying vacuum of 0.1 millimeter mercury at 25° C. for several days. However, some included materials, such as benzene, can be driven off with more drastic treatment, such as prolonged heating at 80° C. to 100° C. at 0.1 millimeter pressure. The residual host compound then reverts to the original crystal structure.

It is by now obvious to the skilled chemist that the process and products of the present invention are extremely useful and significant. Since the host compound (III) of the instant discovery forms inclusion compounds with many organic liquids, wide application of the use of these host materials in the separation and selective absorption of guests can be made. The host, as will be demonstrated more thoroughly hereinafter, is reusable. Typically, the host compounds may be used to remove trace impurities from liquids. As just demonstrated, benzene containing small amounts of xylene or carbon disulfide may be thoroughly rid of these latter two materials by contacting the crude benzene with the host crystals of the present invention.

Obviously, also, this opens up the whole field involving the use of the host compounds for hydrocarbon separation and as organic dessicants.

Typical inert organic liquids within the purview of the present invention are (a) substituted and unsubstituted, branched and straight chain alkanes, alkenes and alkadienes having from 1 to 12 carbon atoms; (b) substituted and unsubstituted benzenes; (c) substituted naphthalenes; (d) substituted and unsubstituted cyclopentane, cyclopentene, cyclopentadiene, cyclohexane, cyclohexene and cyclohexadiene; (e) esters,

of the above wherein R represents substituted and unsubstituted alkyl having from 1 to 12 carbon atoms, phenyl, substituted phenyl, naphthyl and substituted naphthyl; (f) ethers of the formula R—A—R, wherein R is the same as above and A is O or S; (g) ketones of the formula

wherein R is the same as above; and (h) carbon disulfide.

Typical substituents for (a), above, are halo (Br, Cl, I, and F), lower alkoxy, nitro, cyano, hydroxy, and the like; for (b) are halo, lower alkoxy, nitro, cyano, lower alkyl, and the like; for (c) are halo, lower alkoxy, nitro, hydrogen, lower alkyl, and the like; for (d) are halo, lower alkoxy, nitro, lower alkyl, and the like; for R are halo, lower alkoxy, nitro, lower alkyl, and the like.

These are merely typical guest organic liquids which will form inclusion adducts with the products (III) of the present invention. Characteristically, organic compounds in liquid state have an affinity for the host compounds (III) of the present invention and form molecular inclusion clathrates therewith.

The present invention will best be understood from the following examples and it is not intended that these examples, which are illustrative, unduly limit the scope of the present invention, except insofar as these limitations appear in the appended claims.

EXAMPLE 1

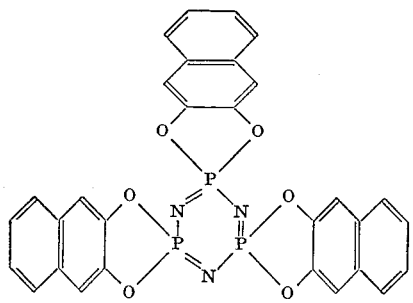

A mixture of phosphonitrilic chloride trimer (50 grams, 0.144 mole), 2,3-dihydroxynaphthalene (69.1 grams, 0.432 mole) and anhydrous, powdered sodium carbonate (91.6 grams, 0.864 mole) in tetrahydrofuran (500 milliliters) is refluxed and stirred for 6 hours and allowed to stand at 25° C. for a further 16 hours. The resulting white precipitate is then filtered off, washed with a large excess of water and dried in a vacuum oven to yield 55 grams of the above-identified product. The product isolated in this way melts at 305° C. to 310° C. It is further purified by recrystallization from benzene to yield white, hexagonal product (see formula, above) crystals, melting point 338° C. to 339° C. This product polymerizes upon heating to 330° C. for 5 hours.

This product, when recrystallized from benzene forms a molecular inclusion adduct with benzene. The adduct has a hexagonal crystal structure. The guest compound (benzene) can be removed by heating at 150° C. in vacuum (0.1 millimeter mercury), and can be detected by mass spectrometry. The ratio of host to guest compounds, as determined by X-ray diffraction is between 0.5 to 1 molecule of guest to 1 molecule of host. A similar adduct can be formed with tetrahydrofuran. The presence of the guest materials can be demonstrated by the infrared spectra.

EXAMPLE 2

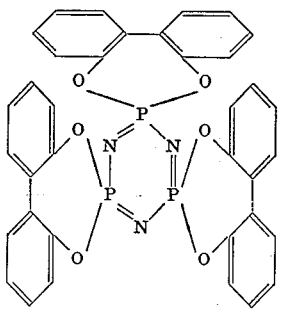

A suspension of sodium carbonate (91.6 grams, 0.864 mole) in a solution of phosphonitrilic chloride trimer (50 grams, 0.144 mole) and 2,2'-dihydroxydiphenyl (81.2 grams, 0.432 mole) in tetrahydrofuran (500 milliliters) is refluxed for a total of 17 hours and is allowed to stand at room temperature for a total of 46 hours. The resulting white, insoluble material is then filtered off, washed with tetrahydrofuran (100 milliliters) and then washed thoroughly with a large excess of water. The solid remaining is dried in a vacuum oven and the weight of this product is 70.5 grams (70% yield). The product identified above by formula, is purified by boiling with a large excess of acetone followed by precipitation into water.

The product, as obtained directly from the reaction mixture contains appreciable quantities of tetrahydrofuran in the form of an inclusion adduct. The tetrahydrofuran can be removed with difficulty by prolonged pumping at 150° C. in vacuum (0.1 millimeter mercury). Other adducts can be formed with benzene or toluene, and the presence of the guest compound can be demonstrated by the infrared spectrum.

EXAMPLES 3–13

The following Table I further illustrates the present invention. Example 1, hereinabove, is repeated in every essential respect in each of the following examples, excepting as shown in the table:

TABLE I

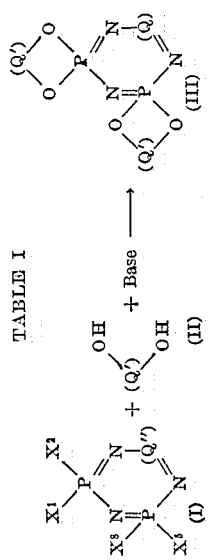

| Example No. | $X^1$ | $X^2$ | $X^3$ | $X^4$ | $X^5$ | $X^6$ | $X^7$ | $X^8$ | Q' | Base | Mole Ratio I:II:Base | Temp., °C. | Solvent | (III) |
|---|---|---|---|---|---|---|---|---|---|---|---|---|---|---|
| 3 | Cl | Cl | Cl | Cl | | | Cl | Cl | (4,4'-dimethoxybiphenyl) | Sodium carbonate | 1.0:2.0:5.0 | 25 | Acetone | di- |
| 4 | Cl | Cl | Cl | Cl | | | Br | Br | (dichloronaphthyl) | Pyridine | 1.0:2.0:7.0 | 75 | Trichloroethylene | di- |
| 5 | Br | Br | Br | Br | Cl | Cl | Cl | Cl | (chloromethyl-tetrahydronaphthyl) | Ammonia | 1.0:40:8.0 | 22 | Chloroform | tetra- |
| 6 | Br | Br | Br | Br | | | Br | Br | (biphenyl) | Triethylamine | 1.0:3.0:4.0 | 45 | Tetrahydrofuran | tri- |
| 7 | Cl | Cl | Cl | Cl | | | Br | Br | (dinitronaphthyl) | Tetraethylguanidine | 1.0:3.3:6.0 | 65 | Dioxane | tri- |
| 8 | Cl | Br | Br | Br | | | Br | Br | (naphthyl) | Triethylammonium hydroxide | 1.0:8.6:6.0 | 10 | Diethylether of diethylene glycol | tri- |
| 9 | Cl | Br | Br | Br | | | Br | Br | (anthryl) | Pyridine | 1.0:2.9:7.0 | −30 | Pyridine | tri- |
| 10 | Br | Br | Br | Br | Br | Br | Br | Br | (4,4'-dibutylbiphenyl) | Ammonia | 1.0:4.2:8.0 | 50 | Toluene | tetra- |

The above Table I, as in Examples 1 and 2, above, further illustrates the present invention. Product (III) in the last column of the table is obvious from reactants (I) and (II) and the mole ratio recited for each example. Therefore, the prefix only of the product name is given, e.g., the product of Example 5 is the corresponding tetra-substituted tetramer of reactant (I) in which Q" is

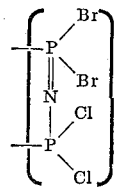

The product hosts of Examples 1–13, above, are brought into contact with the following guest organic compounds by the respective methods (R), (SA) and (V) described hereinabove and molecular inclusion of the guest liquid in the host crystals is thus made to take place:

TABLE II

| Example No. Host | Organic Liquid Guest | Method |
|---|---|---|
| 1 | Dodecane | R |
| 2 | Hexadiene | R |
| 5 | Octane-2 | V |
| 13 | 2-cyanoethane | V |
| 9 | 3-propoxynonane | R |
| 11 | 1-nitroethane | V |
| 4 | 4-hydroxyheptane | SA |
| 6 | 3-nitrobutene-1 | SA |
| 7 | Bromobenzene | R |
| 10 | Ethoxybenzene | V |
| 8 | Nitrobenzene | R |
| 1 | Cyanobenzene | V |
| 13 | Toluene | V |
| 11 | 1-chloronaphthalene | R |
| 12 | 1-methoxynaphthalene | R |
| 5 | Chloroform | V |
| 7 | Octyl propyl ether | R |
| 4 | Cyclopentane | V |
| 10 | 1-chlorocyclohexane | SA |
| 3 | Cyclohexadiene | V |
| 2 | Cyclopentadiene | V |
| 12 | 1-chlorocyclohexane | R |
| 5 | 1-propoxycyclopentane | R |
| 7 | 1-propoxycyclopentane | V |
| 9 | Cyclopentene | V |
| 13 | Butyl ester of octanoic acid | SA |
| 11 | Ethyl ester of 2-nitrohexanoic acid | SA or R |
| 6 | 4-bromododecyl ester of 4-undecanoic acid | SA or R |
| 4 | 1-nitropropyl ester of butanoic acid | SA or R |
| 3 | 3-ethoxyhexyl ester of acetic acid | SA or R |
| 2 | Diethyl ether | V |
| 1 | Ethyl hexyl thioether | V |
| 5 | Octyl propyl ether | SA |
| 4 | 2-nitropropyl nonyl ether | SA |
| 8 | 3-ethoxyhexyl dodecyl ether | SA or R |
| 8 | 2-chlorophenyl propyl ether | SA |
| 5 | Ethyl tolyl thioether | SA |
| 3 | Anisole | SA or R |
| 1 | Phenetole | SA or R |
| 2 | Phenyl ether | SA or R |
| 12 | Benzyl phenyl ether | V |
| 12 | Naphthyl ether | SA or R |
| 10 | Carbon disulfide | SA |
| 4 | 3-pentanone | SA |
| 4 | Pinacolin | SA |
| 3 | Acetophenone | SA or R |
| 11 | Benzophenone | SA or R |
| 2 | 1-phenyl-2-propanone | SA or R |
| 1 | 1-(3-bromophenyl)-3-butanone | SA or R |
| 5 | Butyrophenone | SA or R |
| 8 | Acetodecanone | SA or R |
| 11 | 2-nitro-4-hexanone | SA |
| 13 | 2(1,3-xylyl)-3-pentanone | SA |
| 2 | 2,3-pentanedione | V |

Obviously, numerous other similar hosts and guests may be used successfully.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

TABLE I—Continued

| Example No. | X¹ | X² | X³ | X⁴ | X⁵ | X⁶ | X⁷ | X⁸ | Q' | Base | Mole Ratio I:II:Base | Temp., °C. | Solvent | (III) |
|---|---|---|---|---|---|---|---|---|---|---|---|---|---|---|
| 11 | Cl | Cl | Cl | Br | | | Br | Br | -C₆H₄Cl | Lithium hydroxide | 1.0:1.9:5.0 | 15 | Acetonitrile | di- |
| 12 | Cl | Cl | Cl | Cl | | | Cl | Cl | -OC₂H₅ naphthyl-Cl | Calcium carbonate | 1.0:2.2:5.0 | 95 | Diisobutyl ketone | di- |
| 13 | Cl | Cl | Cl | Cl | | | Cl | Cl | Br-naphthyl-Br | Sodium hydroxide | 1.0:2.8:6.0 | 20 | Dimethyl formamide | tri- |

What is claimed is:
1. The compound of the formula

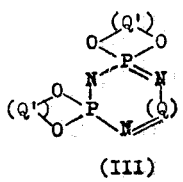

(III)

wherein Q′ represents a member selected from the group consisting of

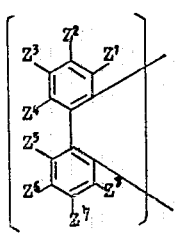 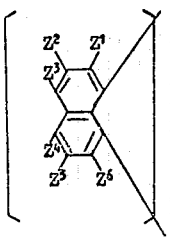 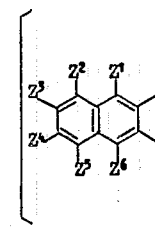

wherein Q represents a member selected from the group consisting of

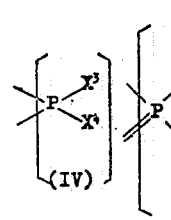 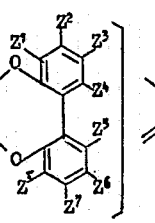 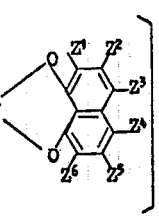

(IV)    (V)    (VI)    (VII)

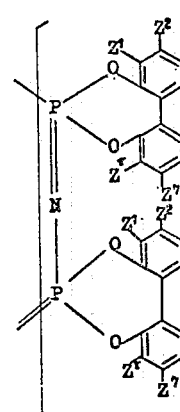 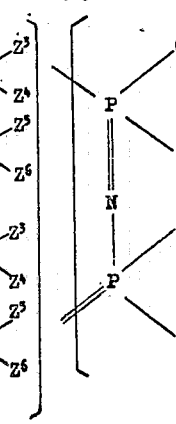 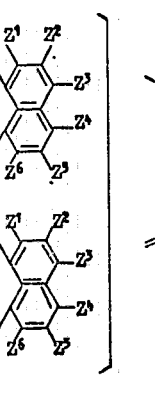

(VIII)    (IX)    (X)

wherein $X^1$ through $X^8$ each represent a member selected from the group consisting of chlorine and bromine; and wherein $Z^1$ through $Z^8$ each represent a member selected from the group consisting of hydrogen, lower alkyl, halogen, lower alkoxy, nitro, halogen(lower)alkyl, cyano and phenoxy.

2. The compound

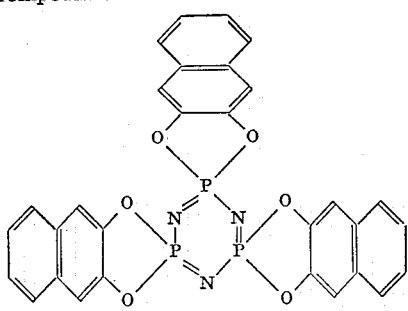

3. The compound

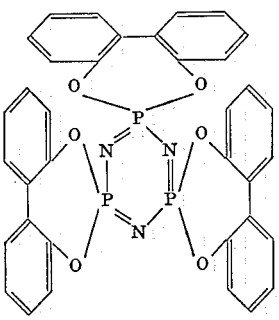

4. A molecular inclusion adduct of an inert organic liquid and a compound of the formula of claim 1.

5. A molecular inclusion adduct of an inert organic liquid and the compound of claim 2.

6. A molecular inclusion adduct of an inert organic liquid and a compound of claim 3.

7. The adduct of claim 4 wherein the inert organic liquid is a member selected from the group consisting of (a) substituted and unsubstituted, branched and straight chain alkane having from 1 to 12 carbons, substituted and unsubstituted, branched and straight chain alkene having from 1 to 12 carbon atoms, and substituted and unsubstituted, branched and straight chain alkadiene having from 1 to 12 carbon atoms; (b) substituted and unsubstituted benzene; (c) substituted naphthalene; (d) substituted and unsubstituted cyclopentane, substituted and unsubstituted cyclopentene, substituted and unsubstituted cyclopentadiene, substituted and unsubstituted cyclohexane, substituted and unsubstituted cyclohexene, and substituted and unsubstituted cyclohexadiene; (e) esters, $$-\overset{\overset{O}{\|}}{C}-OR$$

of (a), (b), (c) and (d), above, wherein R is a member selected from the group consisting of substituted and unsubstituted alkyl having from 1 to 12 carbon atoms, phenyl, substituted phenyl, naphthyl, and substituted naphthyl; (f) ethers of the formula R—A—R, wherein each R is the same as above, R and R being the same or different, and A is selected from the group consisting of oxygen and sulfur; (g) ketones of the formula

wherein each R is the same as above, R and R being the same or different; and (h) carbon disulfide; the substituents for (a), above, being selected from the group consisting of halo, lower alkoxy, nitro, cyano, and hydroxy; the substituents for (b) being selected from the group consisting of halo, lower alkoxy, nitro, cyano, and lower alkyl; the substituents for (c) being selected from the group consisting of halo, lower alkoxy, nitro, hydrogen and lower alkyl; the substituents for (d) being selected from the group consisting of halo, lower alkoxy, nitro, and lower alkyl; and the substituents for R of (e), (f) and (g) being selected from the group consisting of halo, lower alkoxy, nitro and lower alkyl.

8. A method of preparing a molecular inclusion adduct of an inert organic liquid and a compound of the formula of claim 1 which comprises bringing said compound into intimate contact with the inert organic liquid.

9. The method of claim 8 wherein the compound is dissolved in a dilute solution of the inert organic liquid and the compound is recrystallized.

10. The method of claim 8 wherein the inert organic liquid guest is absorbed by the host compound by contacting the compound with the liquid.

11. The method of claim 10 wherein absorption is made to take place by contacting the host compound with the vapors of the inert organic liquid.

12. The method of claim 8 wherein mixed inert organic liquids are treated with said host compound and said host compound selectively includes the smaller molecules of said mixed liquids to the substantial exclusion of the remainder.

No reference cited.

CHARLES B. PARKER, *Primary Examiner.*

A. H. SUTTO, *Assistant Examiner.*